United States Patent Office 2,812,454
Patented Nov. 5, 1957

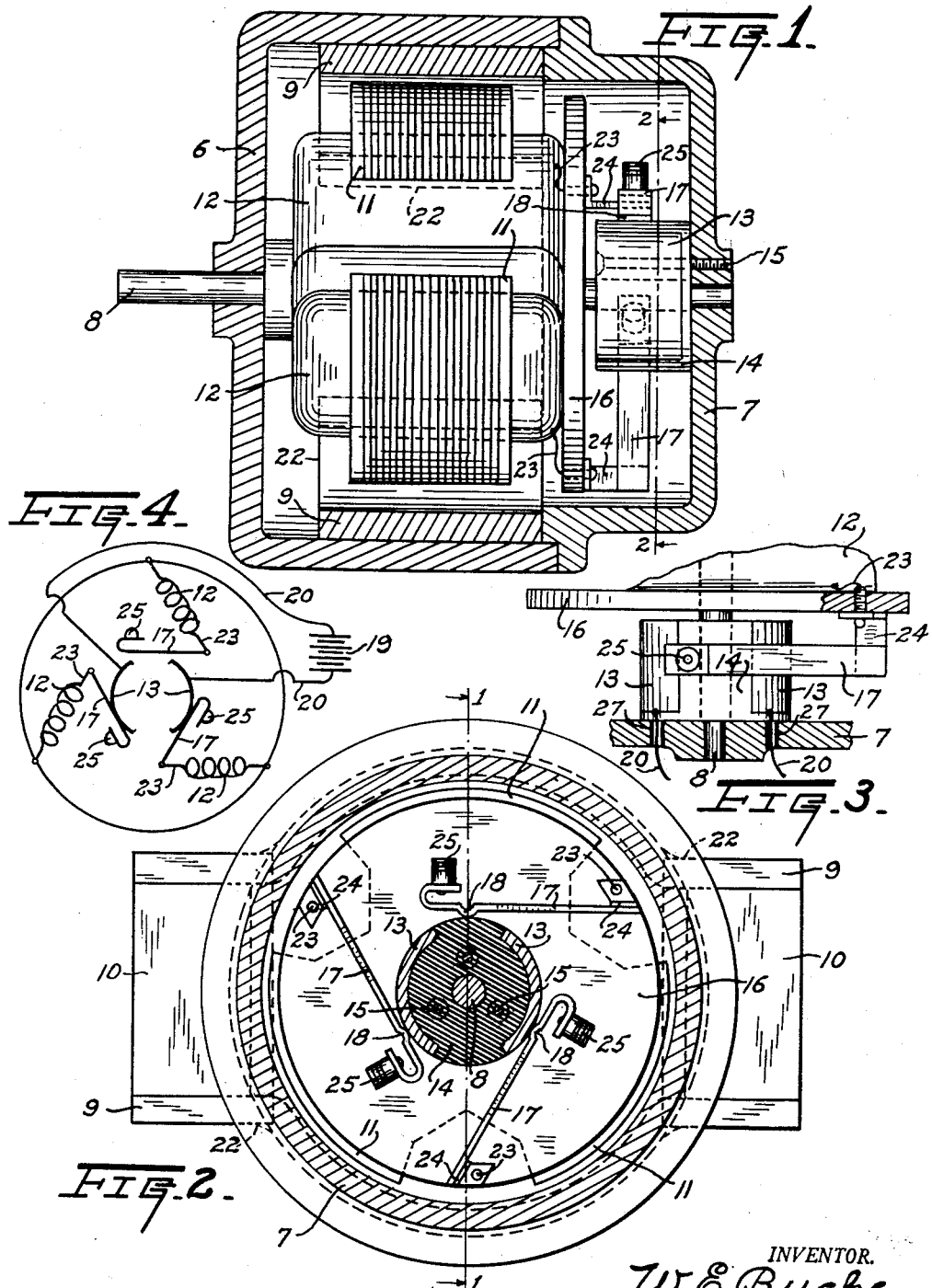

2,812,454

ELECTRIC MOTOR WITH FIXED COMMUTATOR

Willard E. Buck, Boulder, Colo., assignor, by mesne assignments, to Kindar Corporation, a corporation of Delaware Application October 25, 1954, Serial No. 464,247

4 Claims. (Cl. 310—46)

This invention relates generally to improvements in rotary electric motors, and relates more specifically to improvements in the construction and operation of speed controlling mechanisms for such motors.

The main object of the present invention is to provide improved automatically functioning means for effectively regulating the speed of a rotary electric motor.

It has long been common practice to control the speed of an electric motor by utilizing slip rings associated with armature windings which were connected to the source of electric energy through a commutator carried by the rotary armature. These slip rings were necessarily rather complicated and difficult to construct and assemble, and they were also relatively inefficient when applied to small fractional horsepower motors. In order to eliminate the necessity of employing such slip rings for controlling the speed of an electric motor having a commutator rotatable with its armature, I have heretofore proposed utilizing one or more centrifugal switches for cutting out one or more of the armature windings when the motor speed increased, and for restoring the inactive windings to active condition as the motor speed diminished. While this method of speed control is entirely satisfactory, it still introduces some complication in structure by requiring the provision of a separate centrifugal switch or switches in order to maintain accurate speed control, and it has been found that satisfactory results are still obtainable without the aid of such additional switches by utilizing a normally fixed commutator cooperating with revolving brushes.

It is therefore a more specific important object of the present invention to provide an improved electric motor of simplified construction having effective speed regulating mechanism cooperating directly with the current distributing commutator.

Another important object of this invention is to provide an improved rotary electric motor having a commutator composed of normally stationary segments cooperating with revolving brushes carried by the armature.

A further important object of the invention is to provide a compact electric motor assemblage wherein the speed of rotation is accurately controlled by elements operable by centrifugal force and coacting directly with the current distributing commutator of the assemblage.

Still another important object of this invention is to provide an improved constant speed regulator for a rotary electric motor unit having either permanent magnetic or electro-magnetic fields, which is extremely sensitive and efficient in performance.

An additional important object of the invention is to provide various improvements in the construction of rotary electric motors, whereby such motors may be readily manufactured at moderate cost and in relatively small sizes without impairing their efficiency.

These and other more specific objects and advantages of the present invention will be apparent from the following detailed description from which it will be noted that the gist of the improvement is the provision of an electric motor having a rotary armature provided with several revolving poles each having an energizing winding adapted to be connected with a source of electric energy through a revolving brush cooperating with a fixed commutator, one or more of the revolving brushes being automatically displaceable by centrifugal force to maintain the motor speed substantially constant.

A clear conception of the features constituting the present improvement, and of the construction and operation of a typical rotary electric motor embodying the invention, may be had by referring to the drawing accompanying and forming a part of this specification wherein like reference characters designate the same or similar parts in the various views.

Fig. 1 is a somewhat diagrammatic central longitudinal section through a constant speed rotary electric motor having a triple pole revolving armature provided with revolving brushes coacting with a fixed commutator to regulate the motor speed, the section having been taken along the line 1—1 of Fig. 2;

Fig. 2 is a transverse vertical section through the electric motor of Fig. 1, taken along the line 2—2 and viewed in the direction of the arrows;

Fig. 3 is a fragmentary top view of the commutator end of the armature and casing of the motor shown in Figs. 1 and 2, showing the fixed commutator and one of the revolving brushes in elevation; and Fig. 4 is a wiring diagram illustrating the armature connections with the brushes, commutator, and source of electric energy.

While the invention is shown and described herein as having been embodied in an electric motor having a permanently magnetic field and wherein the armature windings are adapted to be energized from a battery, it is not intended to unnecessarily restrict the use of the improvement to such a motor unit; and it is also contemplated that specific descriptive terms employed herein be given the broadest possible interpretation consistent with the actual disclosure.

Referring to the drawing, the typical improved rotary electric motor shown by way of illustration, comprises in general, a main casing 6 having a closure cover 7 at one end; a rotary shaft 8 journalled in the casing 6 and cover 7 and having a power delivery end projecting outwardly beyond the casing; a pair of magnetic pole pieces 9 extending across the interior of the casing 6 on opposite sides of the shaft 8 and being energized by a set of permanently magnetic blocks 10 disposed externally of the casing; a rotary armature secured to the shaft 8 within the casing 6 and having three radial poles 11 each embraced by an energizing winding 12; a stationary commutator having a pair of segments 13 mounted upon an insulation support 14 embracing the shaft 8 and secured within the closure cover 7 by screws 15; a disk 16 secured to the shaft 8 between the armature and the free end of the commutator; an annular series of three current conducting brushes 17 mounted upon the disk 16 to revolve therewith, and each having its outer supporting end connected to one of the windings 12 while its opposite end portion has a contact 18 engageable with the fixed commutator segments 13; and a source of electric energy such as a battery 19 connected by conductors 20 with the fixed segments 13.

The main casing 6 and cover 7 may be formed of any suitable wear resisting material, and may also be united in any desired manner to provide a sealed enclosure for the armature and commutator assemblages. The magnetic pole pieces 9 extend through and are confined within opposed recesses 22 in the casing 6 by the cover 7, and the magnet blocks 10 which energize these pole pieces 9 are preferably formed of material such as "Alnico" metal having high magnetic permeability and adapted to be intensely permanently magnetized. These permanently magnetic blocks 10, however, are not an essential part of the present invention and may be replaced by the well known electro-magnets for energizing the pole pieces 9, and the portions of the latter which are disposed within the casing 6 are arcuate and snugly engage the bore of the circular casing while the portions to which the blocks 10 are attached may be located externally of the motor housing, see Fig. 2.

The central core and radial poles 11 of the rotary armature are composed of ferrous laminations, and the corresponding ends of the windings 12 which embrace these poles 11 are connected to the adjacent brushes 17 by conductors 23 and metallic brackets 24 which support the brushes from their outer ends and are secured to the disk 16, see Figs. 1, 3 and 4. The brushes 17 are formed of resilient metal and are biased inwardly to normally cause their contacts 18 to engage the successive commutator segments 13 as the rotor revolves, and one or more of these brushes are provided at their extreme free ends with weights 25 of either the same or different mass. As shown in Figs. 2 and 4, a weight 25 is attached to the inner end of each brush 17, and each weight 25 is formed of several sections in order to vary its mass, and these weights function to swing the brush contacts 18 out of engagement with the fixed commutator segments 13 under the influence of centrifugal force when the motor loading diminishes and the speed of rotation tends to increase.

The arcuate commutator segments 13 are formed of highly conductive metal and are firmly embedded within the support 14 which is constructed of insulation and is fastened to the closure cap 7 by the screws 15. The opposite ends of the fixed segments 13 should be spaced from the disk 16 and casing cap 7, and the conductors 20 which connect these segments 13 with the source of electric energy must also be insulated from the closure gap 7 as by insulating bushings 27, see Fig. 3. While the source of electric energy for energizing the armature windings 12 has been illustrated as a battery 19, this energy may be derived from any other suitable source.

When an electric motor has been constructed and assembled as shown in the drawing, and the fixed commutator segments 13 are connected to the battery source 19, and with weights 25 of equal mass applied to identical brushes 17, the motor armature and shaft 8 will rotate and will normally cause the successive brush contacts 18 to ride over and to engage the successive commutator segments 13. This engagement of the brushes 17 with the segments 13 will continue only while the motor is operating under normal load and at precisely the predetermined speed, and will cause the motor speed to remain absolutely constant. However, if the load diminishes even a slight amount the speed of rotation will tend to increase, and centrifugal force acting upon the weights 25 will then momentarily cause the brush contacts 18 to swing out of engagement with the segments 13 thereby interrupting the flow of electric current to the armature windings 12 and immediately reducing the speed of rotation sufficiently to cause the contacts 18 to reengage the commutator. This making and breaking of the armature energizing circuits will continue as long as the motor speed tends to vary, and will thus maintain substantially constant speed; but when the normal loading is restored, the resilient inward biasing of the brushes 17 will again maintain the brush contacts 18 in proper position for engagement with the segments 13 and the weights 25 will remain inactive.

This method of speed control with the aid of revolving brushes 17 cooperating with fixed commutator segments 13 is exceedingly simple and effective, and by omitting one or more of the weights 25 while retaining others, it is obviously possible to maintain constant speed by making only one or several of the armature windings 12 inactive as the speed tends to increase. Then too, by utilizing weights 25 of different mass at the ends of the successive brushes 17, these weights 25 may be caused to cut out the windings 12 successively as the motor speed tends to increase, thus providing an extremely flexible regulating system for maintaining substantially constant speed of motors intended for diverse uses. The mass of the weights 25 may be readily varied by removing or adding sections, and the weights may be conveniently entirely removed or applied to selected brushes by utilizing releasable fasteners such as screws, but in most cases the weights 25 are initially finally applied to the brushes before the motor is finally and permanently assembled.

From the foregoing detailed description it should be apparent that the present invention in fact provides an improved rotary electric motor of simple and compact construction having means for automatically and effectively maintaining substantially constant speed under variable loading. The use of the fixed commutator coacting with revolving brushes not only simplifies the entire assemblage, but also makes it possible to apply the centrifugal speed controlling weights directly to these brushes without providing separate switches. The invention is applicable to rotary electric motors of various sizes having either permanently magnetic or electro-magnetic pole pieces cooperating with armature windings which are energized from any suitable source, and the improved motor entirely eliminates the use of complicated slip rings and similar devices for maintaining the desired speed.

It should be understood that it is not desired to limit this invention to the exact details of construction or to the precise mode of operation of the rotary electric motor herein shown and described, for various modifications within the scope of the appended claims may occur to persons skilled in the art.

I claim:

1. In an electric motor, a rotary armature having several revolving poles each provided with an energizing winding, a stationary commutator having a lesser number of segregated segments connected to an outside source of electrical energy, and an independent current supply brush for each of said windings revolvable with said armature and being cooperable with said commutator segments to conduct current from said source to their respective windings, said brushes being operable by centrifugal force induced by the rotation of said rotor to interrupt the current supply to their respective windings and to thereby control the motor speed.

2. In an electric motor, a rotary armature having several revolving poles each provided with an energizing winding, a stationary commutator having a lesser number of segregated segments connected to an outside source of electrical energy, and an independent cantilever current supply brush for each of said windings revolvable with said armature and having its free end weighted and resiliently biased into engagement with said commutator segments to conduct current from said source to its winding, said brushes being distortable by centrifugal force acting upon their end weights and induced by the rotation of said rotor to interrupt the current supply to their respective windings and to thereby control the motor speed.

3. In an electric motor, a rotary armature having revolving poles each provided with an energizing winding, a stationary commutator having segregated segments connected to an outside source of electrical energy, an independent current supply brush for each of said windings revolvable with said armature and being movably cooperable with said commutator segments to conduct current from said source to their respective windings, and independently variable means coacting with each of said brushes and being operable by centrifugal force induced by the rotation of said rotor to interrupt the current supply to their respective windings and to thereby control the motor speed.

4. In an electric motor, a rotary armature having revolving poles each provided with an energizing winding, a stationary commutator having segregated segments connected to an outside source of electrical energy, an independent current supply brush for each of said windings revolvable with said armature and being movably cooperable with said commutator segments to conduct current from said source to their respective windings, and independently adjustable weights carried by each of said brushes and being movable by centrifugal force induced by the rotation of said rotor to interrupt the current supplied to their respective brushes and to thereby maintain the motor speed substantially constant.

References Cited in the file of this patent

UNITED STATES PATENTS

| | | |
|---|---|---|
| 244,287 | Olmstead | July 21, 1881 |
| 1,773,842 | Neuland | Aug. 26, 1930 |
| 1,924,415 | Ringwald | Aug. 29, 1933 |
| 2,216,703 | Ericson | Oct. 1, 1940 |
| 2,414,470 | Juhasz | Jan. 21, 1947 |
| 2,455,494 | Jaynes | Dec. 7, 1948 |

FOREIGN PATENTS

| | | |
|---|---|---|
| 322,409 | Great Britain | Dec. 5, 1929 |